No. 897,649. PATENTED SEPT. 1, 1908.
A. H. PATCH.
CORN SHELLER.
APPLICATION FILED MAY 29, 1906.
2 SHEETS—SHEET 1.
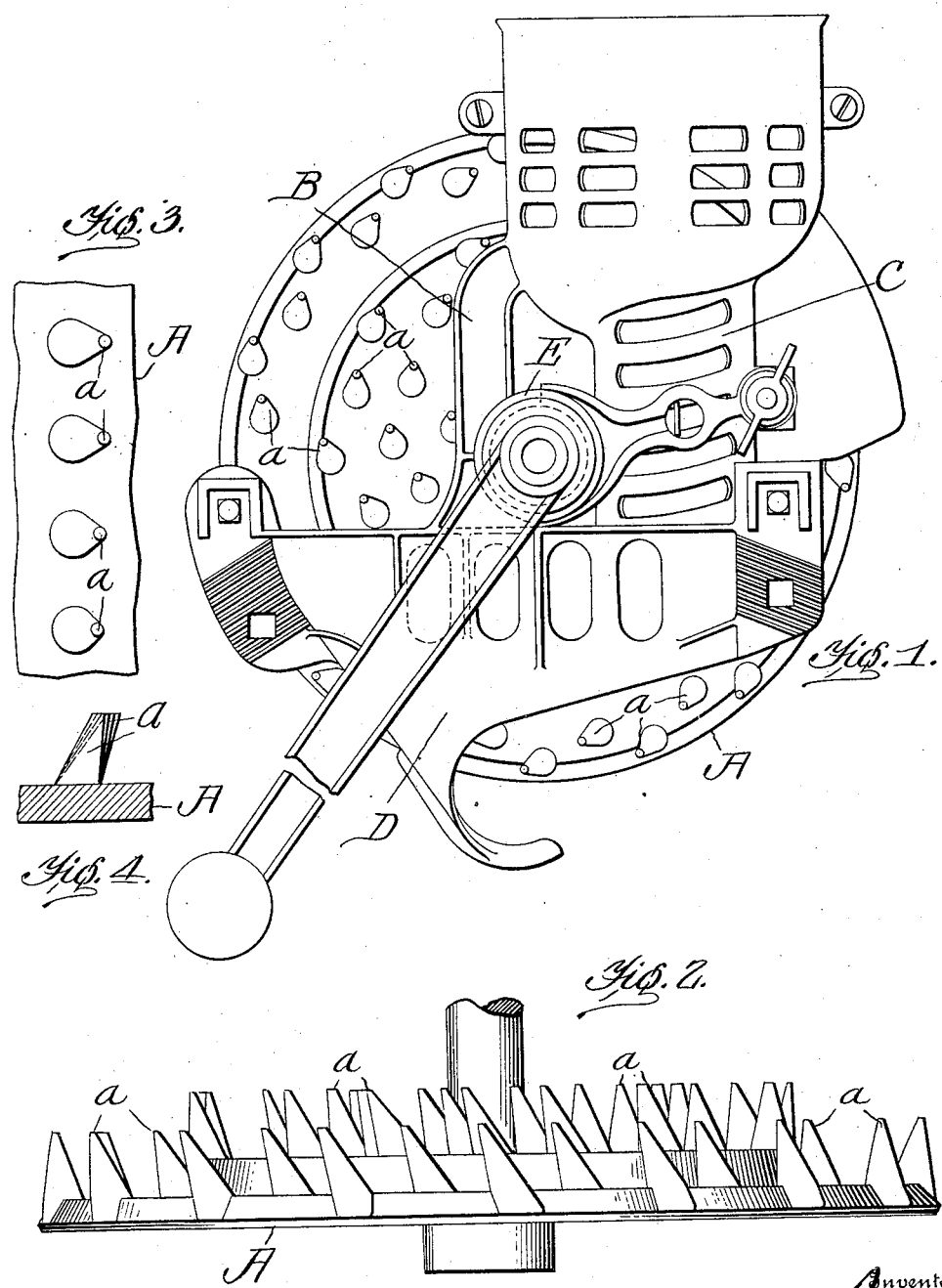
Witnesses
Inventor
Asahel H. Patch

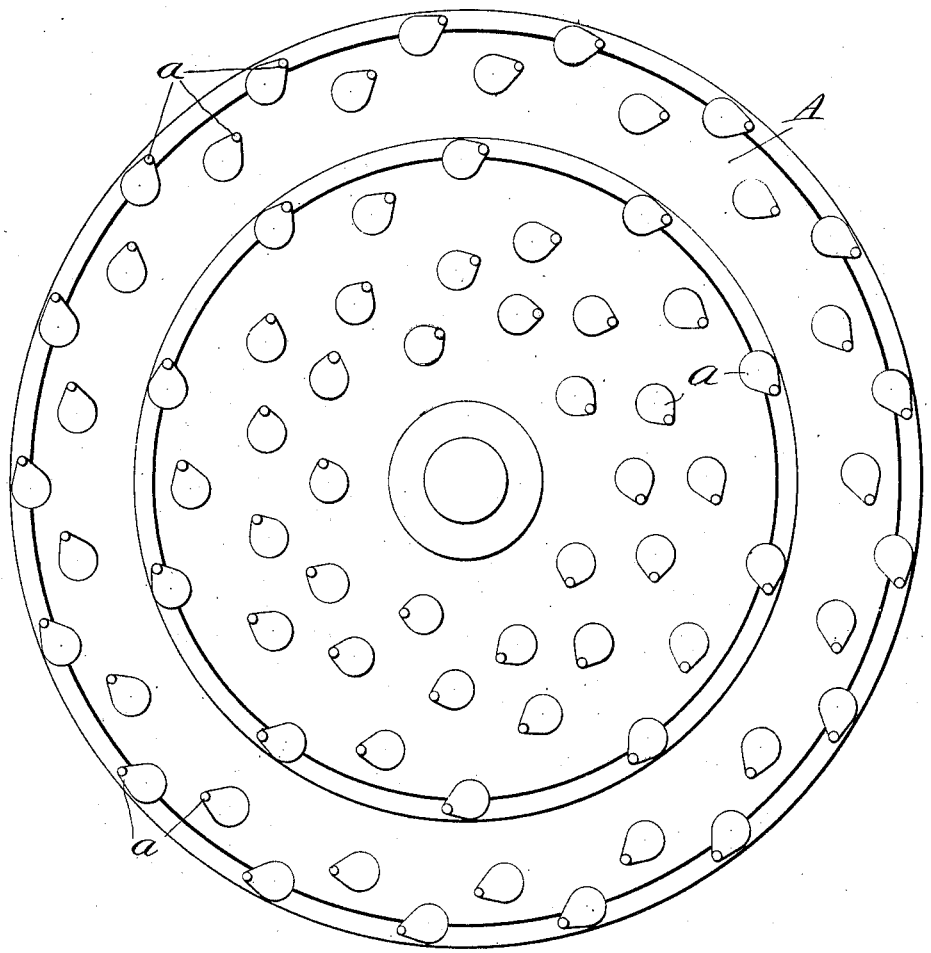

UNITED STATES PATENT OFFICE.

ASAHEL H. PATCH, OF CLARKSVILLE, TENNESSEE.

CORN-SHELLER.

No. 897,649.        Specification of Letters Patent.        Patented Sept. 1, 1908.

Application filed May 29, 1906. Serial No. 319,373.

*To all whom it may concern:*

Be it known that I, ASAHEL H. PATCH, a citizen of the United States, residing at Clarksville, in the county of Montgomery and State of Tennessee, have invented certain new and useful Improvements in Corn-Shellers; and I do hereby declare the following to be a full, clear, and exact description of the invention, such as will enable others skilled in the art to which it appertains to make and use the same.

This invention relates to corn shellers employing a rotary toothed disk for shelling the grains of corn from the ear, which is yieldingly held against the toothed face of the disk by a suitable hopper, chute or guide-frame.

The objects are to reduce the tension or spring-pressure required for holding the ear against the working face of the wheel, and to cause the tooth to act easier and more effectually; which results are accomplished by means substantially as hereinafter described and more particularly pointed out in the claims.

In the accompanying drawings, which form a part of this specification, Figure 1 is a front view of one style of corn sheller having my invention embodied therein. Fig. 2 is a side view of the shelling disk or wheel, viewing the disk edgewise. Fig. 3 is a diagrammatic view showing a plan of a radial series of teeth, and indicating the relative inclinations of the several teeth. Fig. 4 is a diagrammatic view showing an end elevation of the subject-matter of Fig. 3. Fig. 5 is a face view of the wheel.

Referring to the illustrated machine, A denotes the toothed shelling disk or wheel, and B designates the frame of the machine, which is formed with the usual hopper and chute or guide C for directing and controlling the ear of corn while it is subjected to the action of the disk; also with the usual inclined bottom chute D for ejecting the cob. The disk is held yieldingly against the ear by any suitable spring-pressure contrivance, operating either on the disk or on the frame or chute C to hold the one member yieldingly toward the other. In the illustrated construction, a coiled spring E is shown arranged on the disk-shaft or axle.

It will be understood that the particular type of machine, and its general construction and arrangement, are not concerned in the present invention, my improvement being applicable to any of the various styles of machines of this same general character, that is employing a rotary toothed disk operating on the ear in conjunction with a suitable chute, frame or other device for holding the ear in place against the working face of the disk. The invention is, however, especially adapted to shellers of the small hand-operated type, of which the illustrated example is merely one of many different styles.

The essence of the invention resides in the formation and relative arrangement of the teeth $a$, which are disposed over the working face of the disk or wheel. As shown in the drawings, these teeth $a$ are disposed on the disk in a slanting fashion, the several teeth being inclined in their respective directions of rotation, that is inclined in the direction in which the disk revolves in the shelling operation. I prefer to use teeth of conical form, to avoid cracking or abrading the grains of corn, and consequently the teeth appear as oblique cones. Other forms may of course be employed, such as teeth of oblique pyramidal form. By these means the teeth are caused to engage the ear at a slant, materially reducing the spring-pressure required to hold the ear in place against the wheel, and shelling the grains easier and better. The forward slant of the teeth also serves to more effectively clutch the cob, after the grains have been shelled therefrom, and eject the cob through the inclined bottom chute.

At the center of the disk, the inclination of the teeth is preferably such that their fronts slant forwardly a little beyond the perpendicular, and this inclination is preferably increased outwardly toward the rim, the teeth on the rim being more inclined than those on the hub. This relative inclination is shown diagrammatically in Figs. 3 and 4, which represent a series of teeth arranged in a radial line. In the illustrated construction, the disk is of a well-known shape, having a hub portion raised or set inwardly beyond the rim portion. The hub being of relatively small diameter, the teeth thereon may be of practically the same inclination, while the teeth on the rim portion may be set at a greater slant.

In constructing a disk or wheel of this fashion, the metal is cast in a suitable mold, the counterpart of the working face of the disk, and when withdrawing the disk from the mold it must be turned slightly and simultaneously lifted away from the mold, in order to slide the inclined teeth out of the respective inclined holes in the mold, and disengage the casting from the mold. This turning of the disk would of course be reverse to the direction in which it turns in the shelling operation in the machine. The gradations in the inclinations of the teeth from the center outward, facilitate this disengagement, in the casting process.

I claim as my invention and desire to secure by Letters Patent of the United States:

1. A corn-sheller comprising a rotary shelling disk, and means including a spring for yieldingly holding an ear of corn against the working face of the disk, the entire working face of the disk being provided with pointed teeth slanting from the face of the disk in the direction of rotation, whereby the teeth are caused to engage the ear at a slant and the spring-pressure required for holding the ear in place is reduced.

2. A rotary disk for corn-shellers having its working face provided with pointed teeth slanting from the face of the disk in the direction of rotation, the slant of the teeth increasing outwardly from the hub or central portion of the disk.

In testimony whereof I affix my signature, in presence of two witnesses.

ASAHEL H. PATCH.

Witnesses:
BEN A. PATCH,
W. J. SMITH.